United States Patent [19]
Stern

[11] 3,929,002
[45] Dec. 30, 1975

[54] FLUIDIC GAUGING SENSOR HEAD

[75] Inventor: Hansjoerg Stern, Scotia, N.Y.

[73] Assignee: General Electric Company, New York, N.Y.

[22] Filed: Oct. 29, 1974

[21] Appl. No.: 518,268

[52] U.S. Cl. .................................. 73/37.7; 73/160
[51] Int. Cl.² ........................................ G01B 13/08
[58] Field of Search .......... 73/37.7, 37.6, 37.5, 160; 33/DIG. 2

[56] References Cited
UNITED STATES PATENTS

| | | | |
|---|---|---|---|
| 2,408,672 | 10/1946 | Mennesson | 33/DIG. 2 |
| 3,199,339 | 8/1965 | Lipski | 73/37.7 |
| 3,667,282 | 6/1972 | Czwakiel et al. | 73/37.7 |
| 3,769,475 | 10/1973 | Czwakiel | 73/37.7 X |

FOREIGN PATENTS OR APPLICATIONS

| 173,425 | 9/1965 | U.S.S.R. | 73/37.7 |
|---|---|---|---|

Primary Examiner—Richard C. Queisser
Assistant Examiner—Joseph W. Roskos
Attorney, Agent, or Firm—Walter C. Bernkopf; Robert A. Cahill; Frank L. Neuhauser

[57] ABSTRACT

A fluidic gauging sensor head for monitoring a characteristic of a continuously moving strand-like material. The sensor head is comprised of a support block having an open channel bounded by converging side walls extending from a top surface thereof and lengthwise of said support block, and means for admitting pressurized fluid to the channel to sense variations in the back pressure therefrom, which variations are proportional to changes in the characteristic of the material being monitored as the strand-like material passes through the open channel. The strand-like material can be a monofilament material, and the channel can have a V-shaped cross-section. The channel can extend lengthwise in a convex arc so as to cause the continuously moving monofilament material to press against the side walls bounding the channel, and thereby insure that the flow of the fluid through an enclosed gauging area is large compared to any leakage of fluid passing through the interface formed between the monofilament material and the side walls of the channel.

2 Claims, 3 Drawing Figures

FLUIDIC GAUGING SENSOR HEAD

BACKGROUND OF THE INVENTION

1. Field of The Invention

This invention relates to a fluidic gauging sensor head, and, more particularly, to a sensor head for monitoring a characteristic of a continuously moving strand-like material.

2. Description of the Prior Art

One prior art type of fluidic gauging sensor head has a closed tubular or orifice cavity. This type of sensor head is very difficult to thread, especially if the strand-like material, which must pass through the orifice, is continuously moving at a production line velocity in excess of 50 feet per second. Furthermore, if the diameter of the strand-like material were to suddenly and dramatically increase, and if the resulting increased cross-section could not pass through the orifice in the head, the head could be knocked off the production line, and/or the strand-like material could break. In either case production would be halted.

In order to overcome the difficulty of threading strand-like material through the orifice in the above described sensor head, another type of prior art sensor head having upper and lower mating sections can be used. This type of sensor head has the gauging channel formed between the mating surfaces of the upper and lower sections, and the head can be split apart to allow for easy and rapid threading of the head, while the strand-like material is moving at production line speeds. However, in this type of head, if part of the strand-like material is not properly positioned within the gauging channel when the upper and lower half sections of the head are closed, then the material will become trapped between the mating sections, and again the sensor head will be knocked out of position, and/or the strand-like material will break. In either case production will again be halted. Similarly, if the cross sectional area of the strand-like material were to increase dramatically, so that it could not pass through the gauging channel in the sensor head, this type of sensor head would also be knocked out of position, and possibly cause a breakage in the strand-like material.

In order to allow for the passage of the greatly increased cross sectional area of the strand-like material through a small gauge opening, the two-section type sensor head described above is provided with a mechanical mechanism, which mechanism enables the mating sections of the sensor head to split apart a sufficient distance to allow the increased cross sectional area of the strand-like material to pass therethrough. However, sensor heads which have such a mechanism are extremely costly and complex. Furthermore, this mechanism is only useful when monitoring strand-like material at slow production line velocities of, for example, five feet per second. Still further, in the above prior art sensor heads, the relationship between the gauging area of the enclosed channel varies non-linearly with respect to a corresponding variation in the cross sectional area of the material being monitored. This often makes it difficult to calibrate changes in the output pressure signal from the sensor head to corresponding changes in the characteristic of the material being monitored.

OBJECTS OF THE INVENTION

It is therefore an object of this invention to provide a new fluidic gauging sensor head for monitoring a characteristic of continuously moving strand-like material, which head is easier to thread and install on a production line.

It is another object of this invention to provide a new fluidic gauging sensor head which will allow greatly increased cross sectional areas of the strand-like material to pass through the sensing channel without either causing a breakage in the strand-like material or causing the sensor head to be knocked out of position.

It is another object of this invention to provide a fluidic sensor head wherein a change in the gauging area is linearly related to variations in the cross sectional area of the material being monitored.

It is another object of this invention to provide a simple fluidic gauging sensor head of reduced cost and complexity with respect to sensor heads previously used.

Other objects of the invention will be pointed out hereinafter.

SUMMARY OF THE INVENTION

In accordance with a broad aspect of the invention there is provided a fluidic gauging sensor head for monitoring a characteristic of a continuously moving strand-like material. The sensor head is comprised of a support block having an open channel bounded by converging side walls extending from a top surface thereof and lengthwise of the support block, and means for admitting pressurized fluid to the channel to sense variations in the back pressure therefrom proportional to changes in the characteristic of the material being monitored as the strand-like material passes through the open channel.

The strand-like material can be comprised of a monofilament material, and the open channel of the sensor can extend lengthwise in a convex arc to cause the continuously moving monofilament material to press against the converging side walls bounding the channel. A substantially leak-proof seal between the monofilament material and the converging side walls is thereby established, and a gauging area is defined by that portion of the channel which is enclosed by the leak-proof seal. The cross sectional area of the channel can be V-shaped, and the enclosed gauging area varies linearly to changes in the area of the monofilament material passing through the open channel.

DESCRIPTION OF THE PREFERRED EMBODIMENT

The invention will now be explained with reference to FIGS. 1 through 3.

Figure 1:
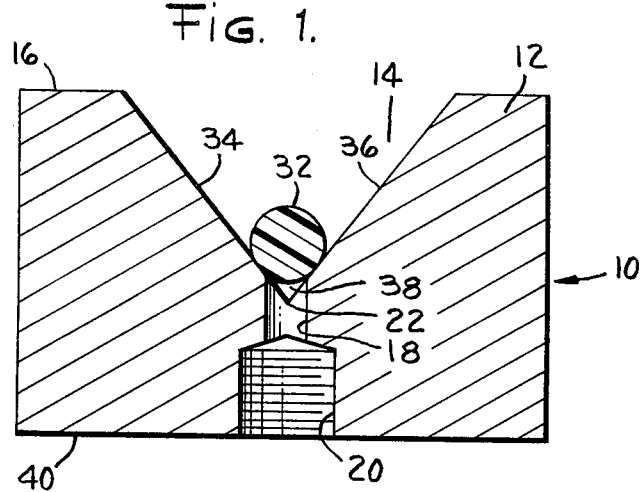
FIG. 1 is a cross sectional view of a fluidic gauging sensor head having a V-shaped open channel for monitoring a continuously moving monofilament material having a circular cross section.
Figure 2:
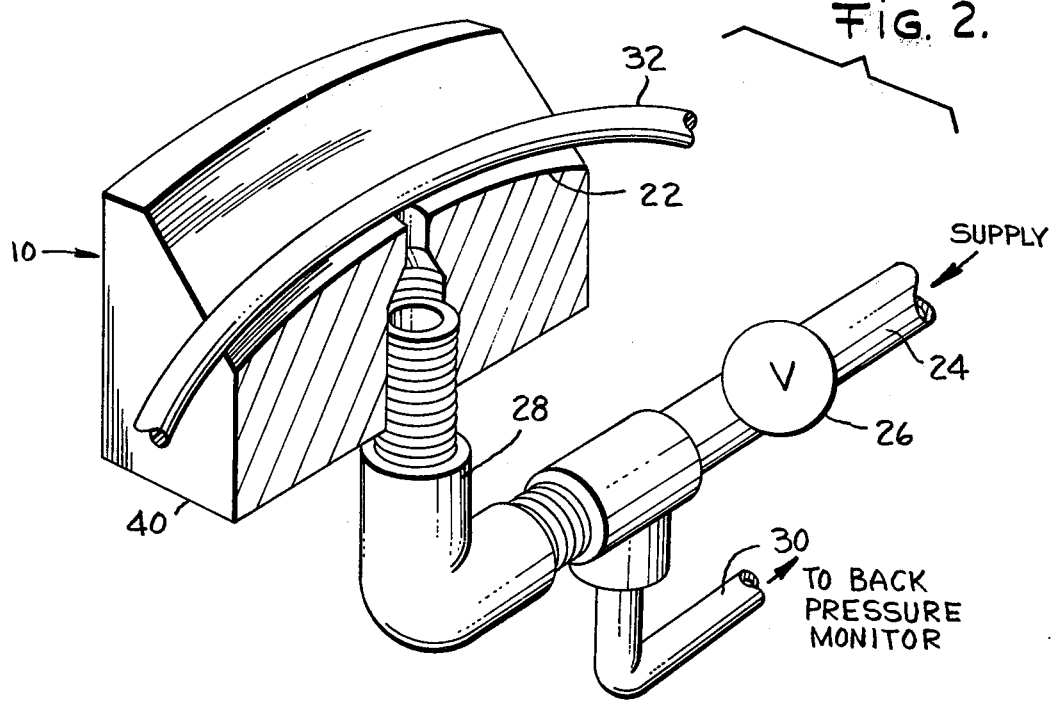
FIG. 2 is a perspective view of a half section of the fluidic gauging sensor head shown in FIG. 1.

Referring to FIGS. 1 and 2, a fluidic gauging sensor head 10 is comprised of a support block 12 having an open channel 14 extending from a top surface 16 thereof and lengthwise of the support block. Support block 12 has consecutive and concentric passageways 18 and 20 for admitting pressurized fluid to an apex 22 of the channel at a medial point in the lengthwise direction thereof to sense variations in the back pressure of the fluidic signal passing through the channel, which back pressure variations are proportional to changes in a characteristic of the material being monitored as the strand-like material passes through the open channel. In this instance, the fluid is a gas, such as air, which is coupled to the channel from a source of supply through a tubing 24, a flow control means 26, and a fluidic coupling member 28 which is fluidically connected to passageway 20 within the support block. The back pressure is monitored by a suitable monitor which is fluidically coupled to the channel via passageways 18 and 20, coupling member 28, and a tubing 30.

In this instance, the continuously moving strandlike material is a monofilament material 32 having a circular cross sectional area, and the characteristic being monitored is the cross sectional area of the monofilament material. It should be understood that other types of strand-like material such as multifilament material could pass through the open channel in the gauge, and other characteristics of the multifilament material, such as its weight, could be monitored.

Figure 3:
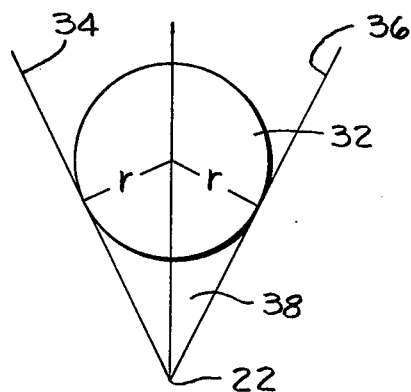
FIG. 3 is a geometric diagram illustrating the relationship between the open V-shaped channel and the circular cross section of the monofilament material which is pressing against the converging side walls of the channel.

In order to monitor the cross sectional area of monofilament material 32, the continuously moving material should press against the converging side walls 34 and 36 bounding V-shaped channel 14 to establish a substantially leak-proof seal therebetween, and to define an enclosed gauging area 38 shown in FIGS. 1 and 3. A means for establishing the substantially leak-proof seal can be comprised of having apex 22 of the channel extend lengthwise of the support block in a convex arc so that the angle of entry and angle of departure of the monofilament material moving through the open channel is approximately between 5° and 10° with respect to a plane formed by the bottom surface 40 of support block 12. This angle of entry and departure should be sufficient to impart a downward force to the monofilament material of sufficient value to overcome an upward pressure ranging from approximately ¼ to 2 psig from the fluid supplied to the channel, and at the same time insure that the flow of the fluid through the gauging area is large compared to any leakage passing through the interface formed between the monofilament material and the converging side walls bounding the channel. Ordinarily a sufficient seal would be provided if approximately at least 90% or more of the fluid supplied to the channel is retained within the gauging area and does not leak through the interface formed between the monofilament material and the side walls of the channel.

Referring to FIG. 3, the enclosed gauging area 38 (Ae) is equal to $r^2$ multiplied by a constant (K), wherein $r$ is the radius of the monofilament material, and K is equal to:

$$1/\tan\alpha - \frac{\pi(90° - \alpha)}{180°}.$$

In this instance $\alpha$ is equal to one half of the angle defined by converging side walls 34 and 36 of the V-shaped channel. Therefore, the gauging area is directly proportional to the square of the radius, or directly proportional to the cross sectional area of the monofilament material, and variations in the gauging area are thus linearly related to variations in the cross sectional area of the monofilament material being monitored.

In operation, when the flow of the fluid from the supply to the guaging area of the channel is sufficiently great that the Reynolds number defining the flow is greater than a critical number, then the flow through the gauging area is orifice flow, and if the Reynolds number is below the critical number, then the flow through the gauging area is capillary flow. Under conditions when the product size of the material is large enough for the flow through the gauging area to be orifice flow, the variation in the back pressure of the fluid within the gauging area, which variation is being monitored by a back pressure monitor, will be linearly proportional to the reciprocal of the variation in cross sectional area of the monofilament material. Similarly, as the diameter of the monofilament material is reduced to a point where the flow of the supply fluid through the gauging area is capillary flow, the variation in back pressure of the fluid within the gauging area, varies inversely with the square of the variation in cross sectional area of the monofilament material.

At this point it should be noted that the fluidic gauging sensor head described above can be used to monitor changes in the cross sectional area of monofilament material over wide ranges of product size. Furthermore, the above described fluidic gauging sensor head requires no tedious threading during installation, and can be easily mounted while the monofilament material is continuously moving through the production line at speeds in excess of 50 feet per second. Furthermore, sudden increases in the cross sectional area of the monofilament material can be handled without causing the sensor head to be knocked out of position, and will not cause a breakage in the material, since the larger cross sectional area can easily pass through the open V-shaped channel.

Although the invention has been described with reference to a specific embodiment thereof, numerous modifications are possible without departing from the invention, and it is desirable to cover all modifications falling within the spirit and scope of this invention.

What I claim as new and desire to secure by Letters Patent of the United States is:

1. A fluidic gauging sensor head for monitoring a characteristic of a continuously moving strand-like monofilament material comprising:

a. a support block having an open channel bounded by converging side walls extending from a surface and lengthwise of said support block;

b. means for admitting pressurized fluid to said channel to sense variations in the back pressure therefrom proportional to changes in the characteristic of the material being monitored as the strand-like material passes through said open channel; and c. means for establishing a substantially leak-proof seal between the monofilament material and said converging side walls bounding said channel to define an enclosed gauging area, said means for establishing a substantially leak-proof seal comprising said channel extending lengthwise in a convex arc, whereby the continuously moving monofilament material presses against said side walls bounding said channel to insure that the flow of the fluid through said gauging area is large compared to any leakage passing through the interface formed between the monofilament material and said side walls.

2. A fluidic gauging sensor head according to claim 1, wherein the cross sectional area of said channel is V-shaped, and said enclosed gauging area varies in proportion to changes in the cross sectional area of the monofilament material passing through said channel, whereby when the flow of the fluid passing through said gauging area is orifice flow, the change in back pressure of the fluid from said channel is proportional to the reciprocal of the variation of the cross sectional area of the monofilament material, and when the flow of the fluid passing through said gauging area is capillary flow, the change in back pressure of the fluid from said channel is proportional to the reciprocal of the square of the variation in the cross sectional area of the monofilament material.

* * * * *